United States Patent
Seo

(10) Patent No.: US 6,581,176 B1
(45) Date of Patent: Jun. 17, 2003

(54) METHOD FOR TRANSMITTING CONTROL FRAMES AND USER DATA FRAMES IN MOBILE RADIO COMMUNICATION SYSTEM

(75) Inventor: Chang Keun Seo, Inchon-kwangyoksi (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,755

(22) Filed: Dec. 31, 1998

(30) Foreign Application Priority Data

Aug. 20, 1998 (KR) .............................. 98/33816

(51) Int. Cl.[7] ................................. H04L 1/18
(52) U.S. Cl. ..................... 714/749; 370/320; 370/474
(58) Field of Search ................ 370/538, 252, 370/230, 231, 310, 469, 389, 349, 521, 474, 209, 320, 342, 471, 216, 335, 332; 714/748–750, 776; 341/106; 375/372, 220, 231, 235, 240; 709/201, 209, 238; 455/442, 522, 67.1, 423

(56) References Cited

U.S. PATENT DOCUMENTS

| | | | | |
|---|---|---|---|---|
| 5,537,414 A | * | 7/1996 | Takiyasu et al. | ............ 370/347 |
| 6,088,342 A | * | 7/2000 | Cheng et al. | ............... 370/320 |
| 6,112,323 A | * | 8/2000 | Meizlik et al. | ............. 714/748 |
| 6,118,834 A | * | 9/2000 | Rasanen | ...................... 370/231 |
| 6,148,208 A | * | 11/2000 | Love | .......................... 370/332 |
| 6,226,301 B1 | * | 5/2001 | Cheng et al. | ................ 370/209 |

OTHER PUBLICATIONS

Nonnenmacher, J. et al. (Optimal multicast feedback; IEEE, Apr. 2, 1998).*

Lifan Gu et al. (New error recovery structures for reliable multicasting; IEEE, Sep. 25, 1997).*

Yamauchi Y (Reliable multicast over the mobile packet radio channel; IEEE, May 9, 1990).*

Leung C.H.C et al. (A new efficient ARQ scheme for satellite communications; IEEE, 1989).*

*Data Service Options for Wideband Spread Spectrum Systems: Radio Link Protocol*, TIA/EIA/IS–707–A.2 (PN–4145.2), V&V Version, (Jul. 1998).

TIA/EIA/IS–707–A.2 dated Jul. 1998 (pp. 4–3-3 4–5).

TIA/EIA/IS–707.2 dated Feb. 1998 (pp. 4–3-3 4–5).

* cited by examiner

*Primary Examiner*—Albert Decady
*Assistant Examiner*—Guy Lamarre
(74) *Attorney, Agent, or Firm*—Fleshner & Kim, LLP

(57) ABSTRACT

In a method for transmitting radio link protocol frames in a mobile radio communication system, if an error occurs on a radio section when user data frames of a radio link protocol (RLP) having respective different series numbers are transferred from a transmitting station to a receiving station, at least one missed user data frame is caused at the receiving station. At this time, the receiving station transmits, repeatedly by first times, a negative acknowledgement (NAK) control frame of the RLP for at least one missed user data frame, to the transmitting station. The transmitting station sends, by second times different from the first times, at least one missed user data frame in response to the received NAK control frame, to the receiving station. Particularly, series numbers of respective missed user data frames are sent through one NAK control frame to the transmitting station, at equal time when a timer for an NAK is expired, to accordingly result in reducing the number of the total NAK control frames and increasing a throughput per unit time.

29 Claims, 5 Drawing Sheets

| FIELD | LENGTH (BITS) |
|---|---|
| SEQ | 8 |
| CTL | 8 |
| FIRST | 8 |
| LAST | 8 |
| FCS | 16 |
| PADDING | VARIABLE |

| FIELD | LENGTH (BITS) |
|---|---|
| SEQ | 8 |
| CTL | 4 |
| RE_NUM | 2 |
| NAK_TYPE | 2 |
| NAK_SEQ | 4 |
| L_SEQ_HI | 4 |
| | |
| FIRST | 12 |
| LAST | 12 |
| FCS | 16 |
| PADDING | VARIABLE |
| | |
| NAK_Map_Count | 2 |
| NAK_Map | |
| NAK_Map_SEQ | 12 |
| NAK_Map | 8 |

FIG. 4

METHOD FOR TRANSMITTING CONTROL FRAMES AND USER DATA FRAMES IN MOBILE RADIO COMMUNICATION SYSTEM

BACKGROUND OF THE INVENTION

1. Field of the Invention

The present invention relates to a method for transmitting control frames and user data frames in a mobile radio communication system.

2. Discussion of Related Art

In a CDMA (Code Division Multiple Access) mobile radio communication system, it is prescribed in a Radio Link Protocol (RLP) of IS-707.2 of February 1998 a relay layer corresponding to a radio section between a terminal device and a base station, for the sake of a circuit data service or a packet data service.

RLP frames can be classified into two types, control frames and user data frames. The user data frames transport user traffic data while the control frames are used to send control information required for RLP initialization and error recovering. The control frames contain important information in RLP operation. As a result, if reliability were not ensured for these control frames, it would negatively impact the performance of an overall system. According to the RLP retransmission procedure, the NAK (Negative Acknowledgement) RLP control frame for a particular user data frame can be transmitted more than once at the same time to ensure the reliability and the missing user data frame will be retransmitted whenever it receives the NAK frame.

Currently, the transmission methods of the NAK control frames in RLP type 1 and RLP type 2 will be described hereinafter.

When an entity receiving RLP frames or an RLP destination transmits NAK control frames for incorrect or lost user data frames, an entity sending RLP or an RLP source retransmits RLP user data frames whenever it receives the NAK control frames. For example, if the RLP source receives two NAK control frames containing the same missing sequence number, it retransmits the missing user data frames twice. In other words, the total number of the retransmission of RLP user data frames matches exactly the total number of NAK frames transmitted containing the sequence number of that user frame.

The above method has a drawback in terms of flexibility. For example, in case of simultaneous voice and packet data service such as the service option VPI, it may occur that the NAK control frames can not be transmitted over a forward channel (FCH) due to a voice packet transmission. In this case, the NAK control frames could be transmitted over a supplemental channel (SCH) with a low frame error rate (FER).

Referring to FIG. 2 showing a structure of the conventional RLP NAK control frame, it is constructed in the RLP NAK control frame by a data frame sequence number field SEQ with a length of 8 bits, a control field CTL with a length of 8 bits, a field FIRST with a length of 8 bits, a field LAST of a length of 8 bits, a frame check sequence field FCS with a length of 16 bits and a field, padding, with a variable length. The control field CTL is made up of a higher rank 4 bits and a lower rank 4 bits. If a value of the higher rank 4 bits is "1100", it represents that the RLP control frame is the NAK frame and it requests to retransmit data frames. At this time, the lower rank 4 bits of the control field CTL is "0000".

A value "11010000" of the field CTL indicates a non-encrypted mode synchronization, a value "11010011" represents an encrypted mode synchronization, a value "11100000" provides a non-encrypted mode acknowledgement, a value "11100011" means an encrypted mode acknowledgement, a value "11110000" indicates a non-encrypted mode synchronization/acknowledgement, and a value "11110011" represents an encrypted mode synchronization/acknowledgement.

The field FIRST represents the 8 bit sequence number of a first data frame for which a retransmission is required. The field FIRST is used only in case of an NAK and its value is "00" except such case. The field LAST indicates the 8 bit sequence number of a last data frame for which the retransmission is required. The field LAST is also used only in case of the NAK and its value becomes "00" except such case.

The field FCS is a frame check sequence, the contents will be generated by 16 bits FCS polynomial specified in 3.1 of RFC 1662. The field FCS shall cover the fields SEQ, CTL, FIRST and LAST. The field, padding, is padding bits and it is required to fill the remainder of the frame. These bits shall be set to "0".

In the conventional method for transmitting the RLP NAK control frames, in case that the number of sequence numbers of basically valid frames are more than the number of sequence numbers anticipated in the receiving station, NAK control frames for user data frames not received to the receiving station are required.

Referring to FIG. 3, when the receiving station receives user data frames with sequence numbers 1,2,3, a sequence number V(N) necessary by the receiving station and a sequence number V(E) estimated by the receiving station become "4". V(R) shown in FIG. 3 indicates received sequence numbers. If a frame error rate (FER) becomes high owing to various causes of a radio section, the receiving station may receive a user data frame of a sequence number 14 instead of the user data frame of the sequence number 4. The receiving station may actually receive user data frames having more sequence numbers than the sequence number 14 since there is much possibility for a burst occurrence of the FER on the radio section. Like this, in case the receiving station receives the user data frame having the sequence number 14, the receiving station sends NAK control frames requiring for user data frames of missed sequence numbers 4 to 13 to the transmitting station. That is, the receiving station requests the transmitting station to retransmit the missed user data frames thereto. At this time, the receiving station operates of each retransmission counter for an NAK about the user data frames having the sequence number 4 to 14. After that, the number of the retransmission counter increases whenever an effective idle frame or a new effective data frame is received.

In case the receiving station does not receive the missed user data frames even till the retransmission counter for the NAK reaches a given threshold, the receiving station requires the retransmission of the missed user data frames from the transmitting station. In other words, the receiving station transfers NAK control frames to the transmitting station A. If user data frames of sequences numbers 5,8,9, 11,13 are received before the timer of the NAK retransmission counter is expired, the NAK timer does not operate for the frames of the sequence numbers 5,8,9,11,13 any more. Then, the receiving station B retransmits NAK control frames only for user data frames not received even by the retransmission of the transmitting station A, to the transmitting station A.

That is to say, an NAK control frame is sent for the user data frame of the sequence number 4 shown in FIG. 3, and after 20 ms, the NAK control frame is resent for the user data frame of the sequence number 4. Also, NAK control frames are sent for the user data frames of sequence numbers 6, 7, and after 20 ms, the NAK control frames are resent for the user data frames of the sequence numbers 6, 7. And then, after 20 ms, an NAK control frame is transmitted for a user data frame of a sequence number 10, and after 20 ms, the NAK control frame is retransmitted for the user data frame of the sequence number 10. Also after 20 ms, an NAK control frame is transferred for a user data frame of a sequence number 12, and after 20 ms, the NAK control frame is retransferred for the user data frame of the sequence number 12 to the transmitting station A.

Supposing that, after the transmission of all the NAK control frames, the receiving station B receives only the user data frame of the sequence number 7 till the NAK timer is expired, the receiving station B again sends the NAK control frames for the respective user data frames having the missed sequence numbers 4,6,10,12 each three times to the transmitting station A. In response to such operation, the transmitting station A transmits the corresponding missed user data frames in the number same as the number of the received NAK control frames, to the receiving station B.

Such conventional method for transmitting NAK control frames has problems described in the following.

That is, despite that the value of the NAK timer is expired for the user data frames of the sequence numbers 4,6,7,10,12 at an equal time, the respective NAK control frames for the respective corresponding user data frames should be transmitted in the conventional method, to accordingly cause some delay. That is, when the NAK timer is expired, the NAK control frames for the respective user data frames not received till that are transferred several times. Then, the transmitting station A retransmits the user data frames by the number of the received NAK control frames. Accordingly, unnecessary delay is caused. For instance, in case the user data frame of the sequence number 4 is not received, the receiving station B transfers the NAK control frame for the sequence number 4 several times when the NAK timer is expired. Thus, a delay time in sending the NAK control frames increases to cause a fall of a throughput per unit time.

A sequential order for transmitting the frames on the traffic channel is as an NAK control frame, a missed user data frame and a new user data frame. Consequently, when one NAK control frame for one user data frame is sent every 20 ms on the traffic channel having many transmissions of the NAK control frames, a point of time in sending the new user data frame low in a prior transmission order is delayed much.

SUMMARY OF THE INVENTION

Accordingly, the present invention is directed to a control frame and user data frame transmitting method that substantially obviate one or more of the limitations and disadvantages of the related art.

An object of the present invention is to provide a method for transmitting user data frames and control frames in a mobile radio communication system capable of ensuring a reliability of an NAK control frame transmission.

Another object of the present invention is to provide a method for transmitting user data frames and control frames in a mobile radio communication system capable of preventing a transmission delay of frames.

A further object of the present invention is to provide a method for transmitting user data frames and control frames in a mobile radio communication system capable of heightening a throughput per unit time.

Additional features and advantages of the invention will be set forth in the description which follows, and in part will be apparent from the description, or may be learned by practice of the invention. The objectives and other advantages of the invention will be realized and attained by the structure as illustrated in the written description, as well as the appended drawings.

To achieve these and other advantages, and in accordance with the purpose of the present invention as embodied and broadly described, it is considered as follows.

It is desirable to send NAK control frames more than the total number of the retransmission of user data frames if the transmission link of the user data frame is more reliable. The opposite case may occur too, that is, there are some other cases where an asymmetric RLP retransmission is also desirable. For instance, we known that it is crucial that the NAK control frames are transmitted as early as possible. However, when it is tried to send many different control frames including the NAK control frames in a CDMA system in which many RLP entities can exist in a mobile station, congestions may be caused in a mapping layer or an MUX/QoS sublayer. In this case, it is needed that the NAK control frames be transmitted over an SCH or the transmission number of the NAK control frames be reduced if a transmission link is in a good condition in terms of frame error rate.

In the inventive method, at equal time when a timer for an NAK is expired, series numbers of missed user data frames are loaded on one NAK control frame and this NAK control frame is transmitted to a transmitting station from a receiving station.

At this time, the retransmission number of the missed user data frames is variable according to a state of a corresponding traffic channel, and such retransmission number is indicated on the NAK control frame.

The transmission number of the same NAK control frames is also variable according to a state of a corresponding channel, and a series number of the NAK control frame, capable of identifying the transmission number is also represented on that NAK control frame.

In a structure of the NAK control frame in accordance with the present invention, there are provided a field NAK__SEQ indicating series numbers of NAK control frames, for checking a duplication, a control field CTL representing NAK control frames requiring a retransmission of missed user data, and a field RE__NUM providing the retransmission number of missed user data frames. Also, the transmission number of that NAK control frames is variable according to the number of user data frames requesting its retransmission.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 illustrates a diagram showing a structure of an RLP NAK control frame in accordance with the present invention.

Figures 1, 2:
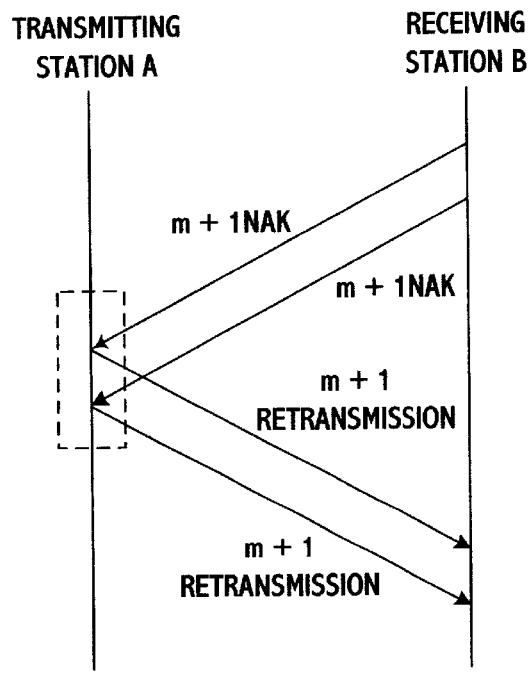
FIG. 1 is a diagram showing a conventional method for transmitting RLP NAK control frames and RLP user data frames.
FIG. 2 represents a diagram providing a structure of a conventional RLP NAK control frame.
Figure 3:
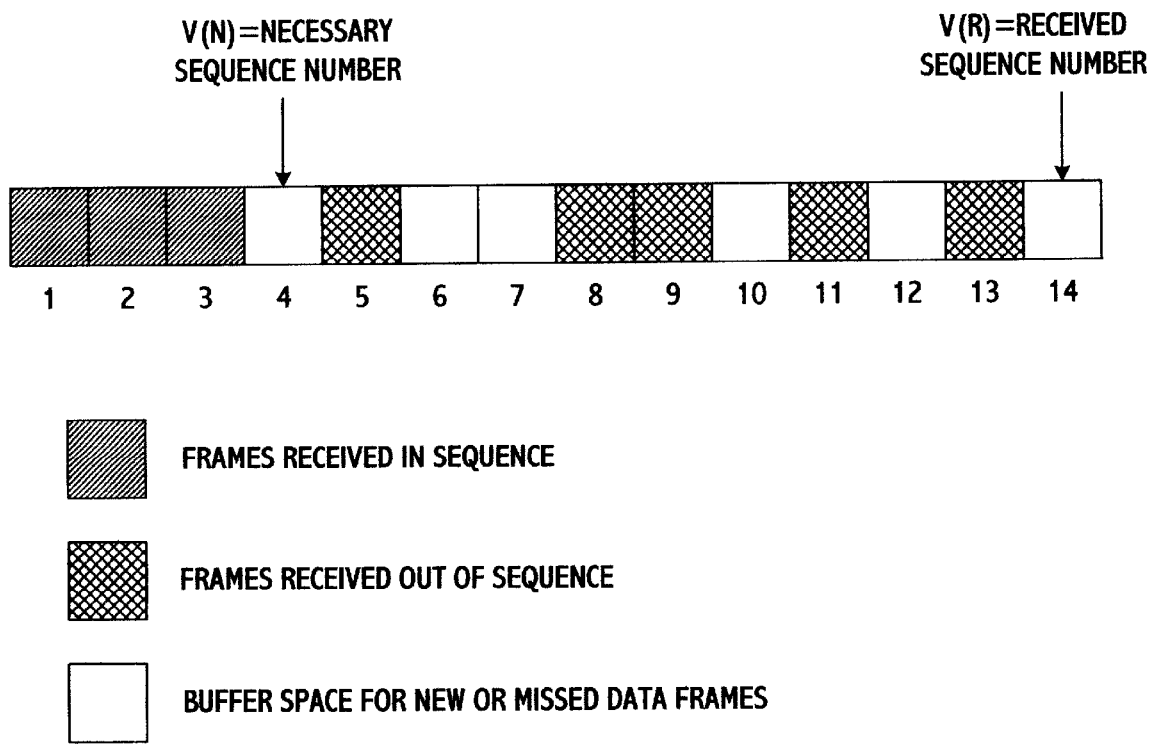
FIG. 3 depicts a diagram illustrating examples of frames received at a receiving station in a conventional method.
Figure 5:
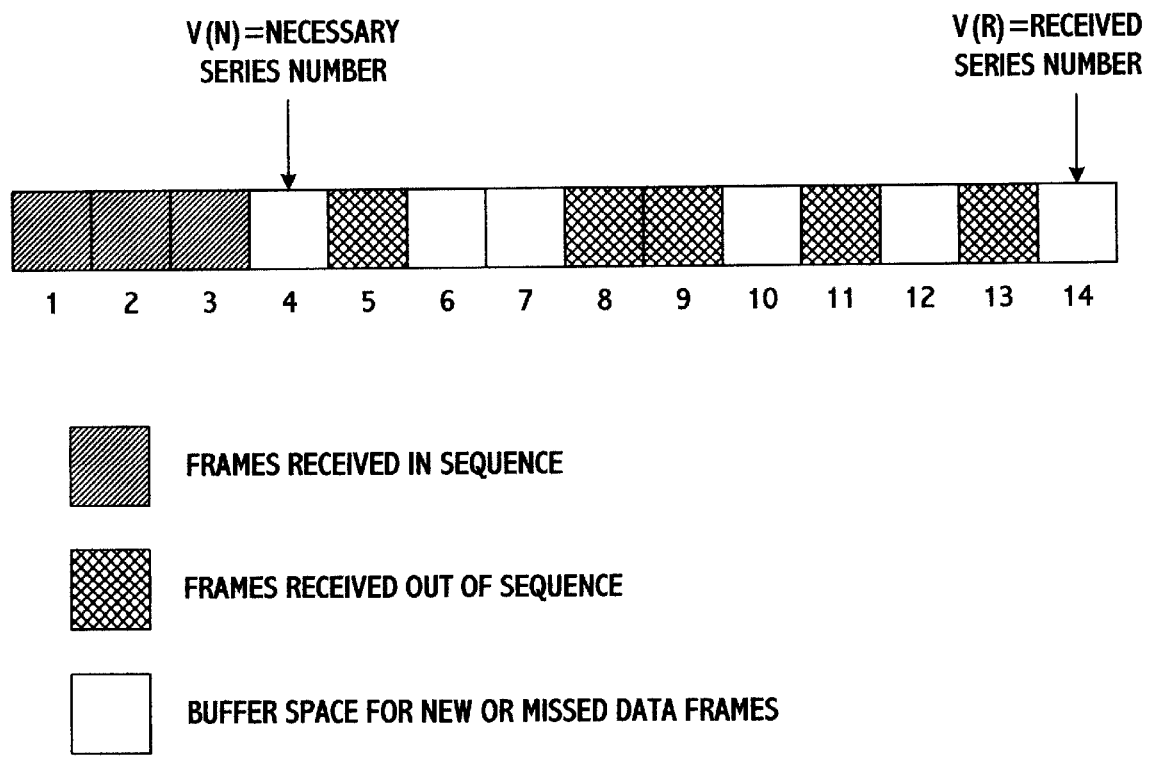

FIG. 5 provides a diagram for examples of frames received at a receiving station in the present invention.

Figure 6:
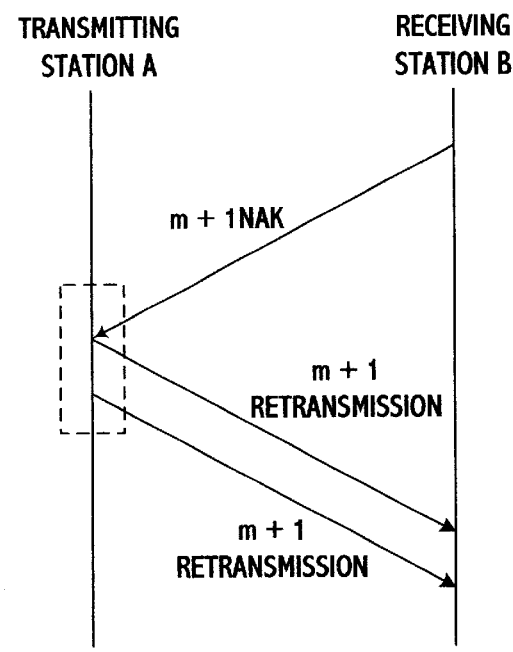

FIG. 6 shows a diagram explaining a method for transmitting NAK control frames and user data frames in accordance with one embodiment of the present invention.

Figure 7:
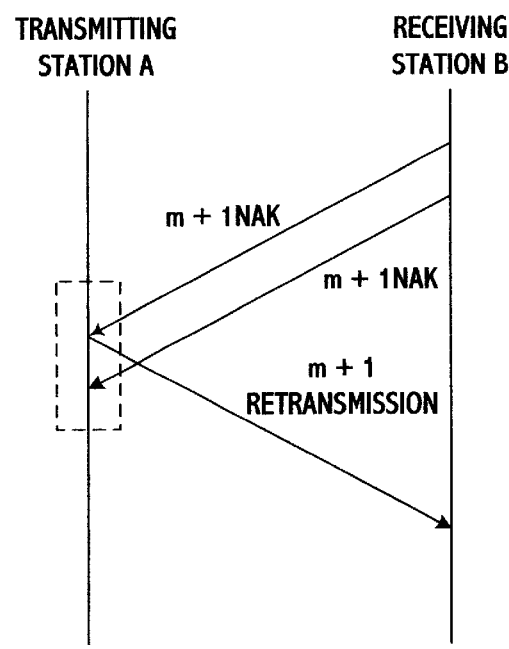

FIG. 7 sets forth a diagram explaining a method for transmitting NAK control frames and user data frames in accordance with another embodiment of the present invention.

DETAILED DESCRIPTION OF PREFERRED EMBODIMENT

Reference will now be made in detail to the preferred embodiments of the present invention, examples of which are illustrated in the accompanying drawings.

In accordance with the present invention, the structure of an NAK control frame prescribed in the existed standard, IS-707, is here compensated. In other words, each NAK control frame corresponding to each missed user data frame is not transmitted in the invention, but only one NAK control frame for all missed user data frames is transmitted to a transmitting station to require a retransmission of the missed user data when a timer for an NAK is actually expired. The transmission number of the NAK control frames is variable according to a quality of a radio section between a receiving station and the transmitting station. The transmission number of the missed user data frames may be also variable according to a quality of the radio section.

FIG. 4 is a table showing the structure of a RLP NAK control frame in the present invention.

Referring to FIG. 4, two new fields NAK_SEQ and RE_NUM are added to the existing RLP NAK control frame considered for a backward compatibility.

The field NAK_SEQ with a length of 4 bits is a sequence number of the NAK control frame for duplication check. A counterpart RLP entity performs a duplication processing when it receives an NAK control frame having the same field NAK_SEQ. A field RE_NUM with a length of 2 bits is a retransmission-number of a missed user data frame. The range of the field RE_NUM is "1" to "4". A field NAK_TYPE with a length of 2 bits indicates an NAK type. When a value of the field NAK_TYPE is "00", the receiving station requests a retransmission of missed user data frames numbered a field FIRST through a field LAST. A field SEQ with a length of 8 bits is a data frame sequence number. A field CTL is a control field and has a length of 4 bits. A value "1100" of the field CTL indicates an NAK control frame and also indicates to request the retransmission of missed user data frames. A field L_SEQ_HI with a length of 4 bits is the most significant 4 bits of L_V(S). A field FIRST with a length of 12 bits is the 12-bit sequence number of the first data frame for which a retransmission is required. A field LAST with a length of 12 bits is the 12-bit sequence number of the last data frame for which a retransmission is required.

A field FCS with a length of 16 bits is a frame check sequence. Its contents shall be generated by the 16-bit FCS polynomial. The field FCS shall cover the fields SEQ, CTL, FIRST, LAST. A field, padding, with a variable length is padding bits and is required to fill the remainder of frames. These bits shall be set to "0". A field NAK_MAP_Count with a length of 2 bits indicates a number less than the number of NAK maps in the NAK control frame. A field NAK_MAP_SEQ with a length of 12 bits is the 12-bit sequence number of the first data frame in this NAK Map for which a retransmission is requested. A field NAK_MAP with a length of 8 bits is a bit-map identifying the missing user data frames for which a retransmission is requested. The most significant bit corresponds to the user data frame identified by the field NAK_MAP_SEQ+1. Each less significant bit corresponds to the next sequential data frame. A bit set to "1" indicates that a corresponding user data frame is missing. If a value of the field NAK_TYPE is "00", the fields FIRST, LAST, FCS, padding, exist. If a value of the field NAK_TYPE is "01", the field NAK_MAP_COUNT exits. If a value of the field NAK_MAP_COUNT+1 exists, there exist the fields NAK_MAP_SEQ and NAK_MAP.

An inventive method for transmitting NAK control frames and user data frames in a mobile radio communication system is described as follows.

Referring to FIG. 5, if the receiving station B receives user data frames having series numbers 1, 2, 3, a necessary series number V(N) or an estimated series number V(E) of the receiving station B is "4". After that, by the way, if the receiving station B receives a user data frame with series number 14 instead of a user data frame with series number 4 due to various causes of a radio section, its necessary series number V(N) becomes "4" as it is, and its estimated series number V(E) becomes "15". Then, the receiving station B transmits an NAK control frame for user data frames of series numbers 4 to 13. At this time, the existing NAK control frame is used as it is. After that, the receiving station B begins an operation of a timer for an NAK, about transmitted NAK control frames, in the existing time method. When the corresponding NAK timer is expired, the receiving station B transmits an NAK control frame only for missed user data frames not received. As shown in FIG. 5, if user data frames of series numbers 5, 8, 9, 11, 13 are received till/before an expiry of the corresponding NAK timer, the receiving station B transfers only one NAK control frame for user data frames with series numbers 4, 6, 7, 10, 12 which are not yet received, though the conventional method is that respective corresponding NAK control frames are transmitted each two times.

In a radio section, frequency bands used on forward and backward traffic channels are different from each other, and radio wave paths thereon are also different. That is, a frame error rate (FER) on the forward traffic channel does not become high together, even though an FER on the backward traffic channel is high. Thus, in a transmission direction of an NAK control frame, a state of the radio section may be good, or not so good or very bad. Supposing that the radio section in such transmission direction is a good state, the receiving station B sends the same NAK control frame having corresponding information only one time to the transmitting station A so that the transmitting station A can transfer missed user data frames to the receiving station B several times, as shown in FIG. 6.

Meantime, in case the frame error rate (FER) of the radio section from the receiving station B transmitting NAK control frames is higher than that from the transmitting station A receiving the NAK control frames, the receiving station B sends the same NAK control frames to the transmitting station A several times more than the number of retransmission of its corresponding user data frames, as shown in FIG. 7. For instance, even if the retransmission of two times for the missed user data is requested, the same NAK control frames may be transmitted four times. Namely, though the NAK control frame is repeatedly transferred four times, the missed user data may be transmitted only two times. Accordingly, when one NAK control frame for the missed user data frames having series numbers 4, 6, 7, 10, 12 shown in FIG. 5 is sent from the receiving station B to the transmitting station A and the retransmission of three times for the missed user data frames from the transmitting station A to the receiving station B is required, it is inserted "3" in the field CTL, wherein "3" is a value of the field CTL of the NAK control frame shown in FIG. 4.

While, in case the frame error rate on a channel belonging to a sending direction of an NAK control frame is higher, so in case it is requested to transfer the NAK control frame four times and transmit missed user data frames corresponding to the NAK control frame two times, the same fields NAK_SEQ having a value "4" are each inserted in the same NAK control frames and a value "2" of the field CTL for a retransmission of respective user data frames is inserted in the user data frame. At this time, the transmitting station A receiving the NAK control frames receives the NAK control frames four times instead of only one time, to thereby reduce further more a probability for not receiving the corresponding NAK control frame.

If the transmitting station A receiving the NAK control frames receives a first NAK control frame, a duplication for three rest NAK control frames can be checked by referring to the fields NAK_SEQ within the frames. After checking, three duplicated NAK control frames are disregarded, and the missed user data frames are re-transmitted to the receiving station B two times by checking a value "2" of the field CTL of the corresponding NAK control frame.

As afore-mentioned, an inventive method for transmitting RLP NAK control frames and user data frames between a terminal device and a base station in the mobile radio communication system such as CDMA has merits as follows.

First, the receiving station B sends one NAK control frame for respective user data frames finished at equal time when a timer for an NAK is expired, thereby resulting in reducing the total number of NAK control frames so enabling to reduce the delay time of user data frames transmitted after that time, namely frames received at a higher rank hierarchy, from a view of the receiving station B transmitting the NAK control frames. In addition, the maximum work processing amount can be attained since the number of data frames transmitted per unit time increases.

Secondly, in the inventive method the retransmission number of missed user data frames is decided, separately from the transmission number of the same NAK control frames, though in the conventional method the retransmission number of the missed user data frames depends upon the transmission number of the NAK control frames. Therefore, in case a quality of a radio traffic channel in an NAK control frame sending direction is not good, it is available to increase the transmission number of the same NAK control frames. Moreover, it is no need to surely make the retransmission number of missed user data and the transmission number of NAK control frames to be same. On the contrary, in case the quality of the radio traffic channel in the NAK control frame sending direction is good, it is available that the transmission number of the NAK control frames become less than the retransmission number of missed user data.

Thirdly, the inventive method is more appropriate to and necessary for a circuit data services or a high-speed data service, since cases for a transmission of idle frames occur in the high-speed data service or file transmission and facsimile services comparatively less than that in the current low-speed data service. Accordingly, in case there is a frame broken in a radio traffic section whose state is not good, it has a high probability that the frame may be a user data frame.

It will be apparent to those skilled in the art that various modifications and variations can be made in the control frame and user data frame transmitting method of the present invention without deviating from the spirit or scope of the invention. Thus, it is intended that the present invention cover the modifications and variations of this invention provided they come within the scope of the appended claims and their equivalents.

What is claimed is:

1. A method for transmitting radio link protocol frames in a mobile radio communication system, comprising:

transferring user data frames of a radio link protocol (RLP) from a transmitting station to a receiving station, said user data frames having respective different series numbers;

transmitting a negative acknowledgment (NAK) control frame of the radio link protocol a first prescribed number of times from the receiving station to the transmitting station when an error occurs in transmitting said user data frames so at least one missed user data frame occurs, the NAK control frame including a NAK sequence number corresponding to the first prescribed number of times and a retransmission number indicating a number of retransmissions of the at least one missed user data frame, where the retransmission number is variably selected for each NAK control frame; and sending at least one missed user data frame a second prescribed number of times in response to said NAK control frame from the transmitting station to the receiving station in accordance with at least one of a forward communication quality and a reverse communication quality, wherein the second prescribed number is equal to the number indicating a number of retransmissions.

2. The method of claim 1, wherein said first and second prescribed number of times are variably decided according to a quality of a radio section between the transmitting station and the receiving station in a direction that NAK control frame is transmitted.

3. The method of claim 2, wherein said first prescribed number of times is less than said second prescribed number of times when the quality of said radio section is good.

4. The method of claim 2, wherein said first prescribed number of times is more than said second prescribed number of times when the quality of said radio section is not good.

5. The method of claim 1, wherein said NAK control frame each has series numbers necessary for identifying said NAK control frames transmitted by said first prescribed number of times.

6. The method of claim 1, wherein series numbers of said missed user data frames are represented on one NAK control frame and the NAK control frame with the series numbers is transmitted from the receiving station to the transmitting station, at equal time when a timer for an NAK is expired.

7. The method of claim 1, wherein said second prescribed number of times is represented on said NAK control frame.

8. The method of claim 1, wherein said NAK control frame comprises:
   (a) a field with a length of 4 bits which is a sequence number of the NAK control frame for duplication check;
   (b) a field with a length of 2 bits which is a retransmission-number of at least one missed user data frame; and
   (c) a control field with a length of 4 bits, a value "1100" of said control field indicating the NAK control frame and also indicating to request a retransmission of said at least one missed user data frame.

9. The method of claim 8, wherein a value of said (b) field is any one out of "1" through "4".

10. The method of claim 8, wherein said NAK control frame further comprises:
   (d) a field with a length of 2 bits which indicates an NAK type, a value "00" of said (d) field indicating to request the retransmission of said at least one missed user data frame numbered as a field FIRST through a field LAST;
   (e) a field with a length of 8 bits which is a data frame sequence number;
   (f) a field with a length of 4 bits which is the most significant 4 bits;
   (g) a field FIRST with a length of 12 bits which is the 12-bit sequence number of a first user data frame for which the retransmission is required;
   (h) a field LAST with a length of 12 bits which is the 12-bit sequence number of a last user data frame for which the retransmission is required;
   (i) a field with a length of 16 bits which is a frame check sequence;
   (j) a field with a variable length which is padding bits and is required to fill the remainder of the NAK control frame;
   (k) a field with a length of 2 bits which indicates a number less than the number of NAK maps in the NAK control frame;
   (l) a field with a length of 12 bits which is the 12-bit sequence number of said first user data frame in this NAK map for which the retransmission is requested; and
   (m) a field with a length of 8 bits which is a bit-map identifying said at least one missed user data frame for which the retransmission is requested.

11. The method of claim 10, wherein said (g), (h), (i) and (j) fields exist when a value of said (d) field is "00", said (k) field exists when the value of said (d) field is "01", and said (l) and (m) fields exist when the value of said (k) field+1 exists.

12. The method of claim 1, wherein received NAK control frames are analyzed by the transmitting station to determine whether a corresponding missed user data frame has already been sent to the receiving station.

13. The method of claim 12, wherein if it is determined that the corresponding missed user data frame has already been retransmitted to the receiving station then the missed user data frame is not again retransmitted.

14. The method of claim 12, wherein the received NAK control frames include a sequence number of the NAK control frame and a retransmission number of a missed user data frame used to determine whether the corresponding missed user data frame has already been sent to the receiving station.

15. A method for transmitting RLP frames in a mobile radio communication system, comprising:
   transmitting user data frames having series numbers from a transmitting station to a receiving station;
   transferring at least one negative acknowledgement (NAK) control frame for user data frames having non-received series numbers from the receiving station to the transmitting station;
   operating a timer for said NAK control frames transmitted, in the receiving station, said timer being for a NAK;
   sending one NAK control frame a first prescribed number of times for a missed user data frame or missed user data frames, which is/are not received until said timer is expired, from the receiving station to the transmitting station, said NAK control frame comprising (A) a control field for requesting a retransmission of said missed user data frame or frames, (B) a field for indicating a second prescribed number of times which represents a number of retransmissions of the missed user data frame or frames such that the number of retransmissions of the missed user data frame can be dynamically changed between NAK control frames, and (C) a field for indicating a NAK control frame sequence number corresponding to said first prescribed number of times, for duplication check; and
   transmitting the missed user data frame or frames the second prescribed number of times from the transmitting station to the receiving station, when said NAK control frame is received by the first prescribed number of times.

16. The method of claim 15, wherein said NAK control frame includes series numbers of said missed user data frame or frames.

17. The method of claim 15, further comprising:
   detecting a duplication of the NAK control frames received continuously in the receiving station, by using said (C) fields of the NAK control frames, when the transmitting station receiving the NAK control frames receives a first NAK control frame; and
   disregarding the followed NAK control frames when the duplication is detected and retransmitting the missed user data frame or frames by the second prescribed number of times from the transmitting station to the receiving station, said second prescribed number corresponding to a value of said (A) field of the received NAK control frame.

18. The method of claim 15, wherein said (A) field has a length of 4 bits, said (B) field has a length of 2 bits and said (C) field has a length of 4 bits.

19. The method of claim 15, wherein a value of said (B) field has a range of "1" through "4".

20. The method of claim 15, wherein said first and second prescribed number of times are variably decided according to a quality of a radio section between the transmitting station and the receiving station in a direction that said NAK control frame is transmitted.

21. The method of claim 15, wherein said first prescribed number of times is less than said second prescribed number of times when the quality of said radio section is good.

22. The method of claim 15, wherein said first prescribed number of times is more than said second prescribed number of times when the quality of said radio section is not good.

23. The method of claim 15, wherein said NAK control frame further comprises:
   (D) a field with a length of 2 bits which indicates an NAK type, a value "00" of said (D) field indicating a request for retransmission of said at least one missed user data frame numbered as a field FIRST through a field LAST;

(E) a field with a length of 8 bits which is a data frame sequence number;

(F) a field with a length of 4 bits which is the most significant 4 bits;

(G) a field FIRST with a length of 12 bits which is the 12-bit sequence number of a first user data frame for which the retransmission is required;

(H) a field LAST with a length of 12 bits which is the 12-bit sequence number of a last user data frame for which the retransmission is required;

(I) a field with a length of 16 bits which is a frame check sequence;

(J) a field with a variable length which is padding bits and is required to fill the remainder of the NAK control frame;

(K) a field with a length of 2 bits which indicates a number less than the number of NAK maps in the NAK control frame;

(L) a field with a length of 12 bits which is the 12-bit sequence number of said first user data frame in this NAK map for which the retransmission is requested; and (M) a field with a length of 8 bits which is a bit-map identifying said at least one missed user data frame for which the retransmission is requested.

24. The method of claim 23, wherein said (G), (H), (I) and (J) fields exist when a value of said (D) field is "00", said (K) field exists when the value of said (D) field is "01", and said (L) and (M) fields exist when the value of said (K) field+1 exists.

25. The method of claim 15, wherein received NAK control frames are analyzed by the transmitting station to determine whether a corresponding missed user data frame has already been sent to the receiving station.

26. The method of claim 25, wherein if it is determined that the corresponding missed user data frame has already been retransmitted to the receiving station then be missed user data frame is not again retransmitted.

27. A negative acknowledgment (NAK) control frame for a communication system configured to allow a number of retransmissions of RLP data frames to be dynamically modified as compared to a previous NAK control frame, comprising:

a sequence field to indicate a data frame sequence number;

a control field to indicate a request for retransmission of missed user data;

a first field to indicate a first frame of missed data to be retransmitted;

a last field to indicate a last frame of missed data to be retransmitted;

a negative acknowledgment sequence number field to determine if the missed data has already been retransmitted according to a previous NAK control frame; and a retransmission number to indicate a number of retransmissions of the missed user data frame.

28. The control frame of claim 27, wherein a transmitting station transmits user data to a receiving station, the receiving station transmits the NAK control frame to the transmitting station when user data is not received, and wherein the transmitting station analyzes data in each of the fields of the NAK control frame to determine whether the missed user data should be retransmitted.

29. The control frame of claim 28, wherein missed user data is not retransmitted if the missed data was already retransmitted to the receiving station based on a previous NAK received by the transmitting station.

* * * * *